(12) United States Patent
Gottwald

(10) Patent No.: US 9,416,710 B2
(45) Date of Patent: Aug. 16, 2016

(54) METERING ARRANGEMENT FOR A LIQUID EXHAUST-GAS AFTERTREATMENT MEDIUM AND METERING METHOD

(71) Applicant: Robert Bosch GmbH, Stuttgart (DE)

(72) Inventor: Frank Gottwald, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/364,788

(22) PCT Filed: Dec. 6, 2012

(86) PCT No.: PCT/EP2012/074589
§ 371 (c)(1),
(2) Date: Jun. 12, 2014

(87) PCT Pub. No.: WO2013/087492
PCT Pub. Date: Jun. 20, 2013

(65) Prior Publication Data
US 2015/0068194 A1    Mar. 12, 2015

(30) Foreign Application Priority Data
Dec. 12, 2011  (DE) .......................... 10 2011 088 217

(51) Int. Cl.
*F01N 3/24*   (2006.01)
*F01N 3/20*   (2006.01)

(52) U.S. Cl.
CPC ............. *F01N 3/208* (2013.01); *F01N 2610/01* (2013.01); *F01N 2610/02* (2013.01);
(Continued)

(58) Field of Classification Search
CPC ... F01N 3/208; F01N 3/2066; F01N 2610/02; F01N 2610/14; F01N 2610/144; F01N 2610/1406; F01N 2610/1433; F01N 2610/1466; F01N 2610/1473; F01N 2610/1486; F01N 2610/1493; Y02T 10/24
See application file for complete search history.

(56) References Cited

U.S. PATENT DOCUMENTS

2007/0283685 A1    12/2007  Ripper et al.
2010/0024402 A1*    2/2010  Bruhn .................. F01N 3/0293
                                                    60/295
2010/0242439 A1     9/2010  Domon et al.

FOREIGN PATENT DOCUMENTS

DE    102008000594    9/2009
DE    102009029408    3/2011
(Continued)

OTHER PUBLICATIONS

Machine translation of DE 102008000594 A1 accessed Mar. 19, 2015.*

(Continued)

*Primary Examiner* — Jonathan Matthias
(74) *Attorney, Agent, or Firm* — Michael Best & Friedrich LLP

(57) ABSTRACT

A metering arrangement (3, 30) is proposed for a liquid exhaust-gas aftertreatment medium for the aftertreatment of the exhaust gas of an internal combustion engine which has an exhaust-gas system, in particular for a urea/water solution, having a delivery pump (7) and a metering module (13), wherein the delivery pump (7) is connected to a suction line (23) for sucking the exhaust-gas aftertreatment medium out of a tank (1), wherein the delivery pump (7) and the metering module (13) are connected to one another via a pressure line (25), and the exhaust-gas aftertreatment medium can be fed via the metering module (13) to the exhaust-gas system, wherein a recirculation pump (8) is arranged parallel to the delivery pump (7), wherein the recirculation pump (8) is connected on the suction side to the metering module (13). Furthermore, a corresponding method for metering is proposed.

9 Claims, 2 Drawing Sheets

(52) U.S. Cl.
CPC ....... *F01N2610/14* (2013.01); *F01N 2610/148* (2013.01); *F01N 2610/1426* (2013.01); *F01N 2610/1433* (2013.01); *F01N 2610/1473* (2013.01); *Y02T 10/24* (2013.01)

(56) References Cited

FOREIGN PATENT DOCUMENTS

| DE | 102011081628 | 2/2013 |
|---|---|---|
| JP | 2008101564 A * | 5/2008 |
| JP | 2011001895 A * | 1/2011 |

OTHER PUBLICATIONS

Machine translation of JP 2011-001895 A accessed Mar. 19, 2015.*
Machine translation of JP 2008-101564 A, accessed on Jul. 14, 2015.*
International Search Report for Application No. PCT/EP2012/074589 dated Mar. 15, 2013 (English Translation, 2 pages).

* cited by examiner

METERING ARRANGEMENT FOR A LIQUID EXHAUST-GAS AFTERTREATMENT MEDIUM AND METERING METHOD

BACKGROUND OF THE INVENTION

The invention is based on a metering arrangement and a metering method of the generic type.

In auto-ignition internal combustion engines, an SCR catalytic converter is frequently provided in the exhaust gas system in order to comply with environmental regulations. So that the SCR catalytic converter can convert the NOx compounds contained in the exhaust gas into water and atmospheric nitrogen, an exhaust-gas aftertreatment medium, for example a liquid urea/water solution which serves as a reducing agent, is injected into the exhaust gas section upstream of the SCR catalytic converter. For this purpose, for example a metering system comprising a reducing agent tank, a reducing agent pump and a metering module which operates similarly to the injector of a fuel injection system are used. The pump and assigned components are also referred to as a feed module.

The objective of the feed module or of the pump is to suck urea/water solution out of the tank and build up sufficient pressure on the pressure side so that the liquid urea/water solution is finely atomized as soon as the metering module is opened in a way which is controlled according to requirements and feeds the exhaust-gas aftertreatment medium in particular to the exhaust gas system downstream of the engine. The injector is therefore connected, like the feed module, to a control device of the internal combustion engine and is opened and closed thereby in accordance with requirements. The same also applies to the operation of the feed pump. Since urea/water solution has the property of freezing at low temperatures and at the same time increasing its volume by approximately 11%, measures have to be taken to prevent damage to the metering system by freezing urea/water solution.

For this purpose, EP1812144 discloses ventilating lines which conduct urea/water solution. For this purpose, the pump is designed with a reversible feed direction and a valve for reversing the feed direction of the pump is provided. Said document describes, as does also DE102011081628 published after the priority date of said document, that optionally a second pump can be provided in order to pump the urea solution out of the region of the feed line.

From DE102009029408 it is also known to integrate a 4/2-way valve into the metering system. In a first switched position of the 4/2-way valve the pump feeds reducing agent from the tank to the metering module. If the internal combustion engine is to be switched off, the 4/2-way valve is placed in the second switched position, with the result that the pump of the feed module feeds liquid reducing agent from the metering module into the tank and as a result ventilates parts of the metering system. This requires the metering module to be opened and air or exhaust gas to be able to flow on into the metering system from the exhaust gas section.

As a result of the partial ventilation of the metering system a compressible air bubble is produced, with the result that if the remaining reducing agent in the metering system is frozen, the pressure of the ice which results therefrom is so low that no damage can occur to the metering system. Such a 4/2-way valve is, however susceptible to faults and expensive.

SUMMARY OF THE INVENTION

The metering arrangement according to the invention and the method according to the invention for metering an exhaust-gas aftertreatment medium, in contrast, the advantage that cost-effective and reliable emptying of the metering system after the internal combustion engine has been switched off is ensured. Because the recirculation pump serves merely to ventilate or empty the metering system, a low feed pressure is sufficient. Only small requirements are also made of the feed pressure of the recirculation pump. As a result, the recirculation pump according to the invention is more cost-effective than a 4/2-way valve. Furthermore, such a pump is less susceptible to faults than a switchable 4/2-way valve.

As a result of the measures specified in the dependent claims, advantageous developments and improvements of the metering arrangement specified in the independent claims and the specified method are possible.

BRIEF DESCRIPTION OF THE DRAWINGS

Exemplary embodiments of the invention are illustrated in the drawing and explained in more detail in the following description.

In the drawing.

DETAILED DESCRIPTION

Figure 1:
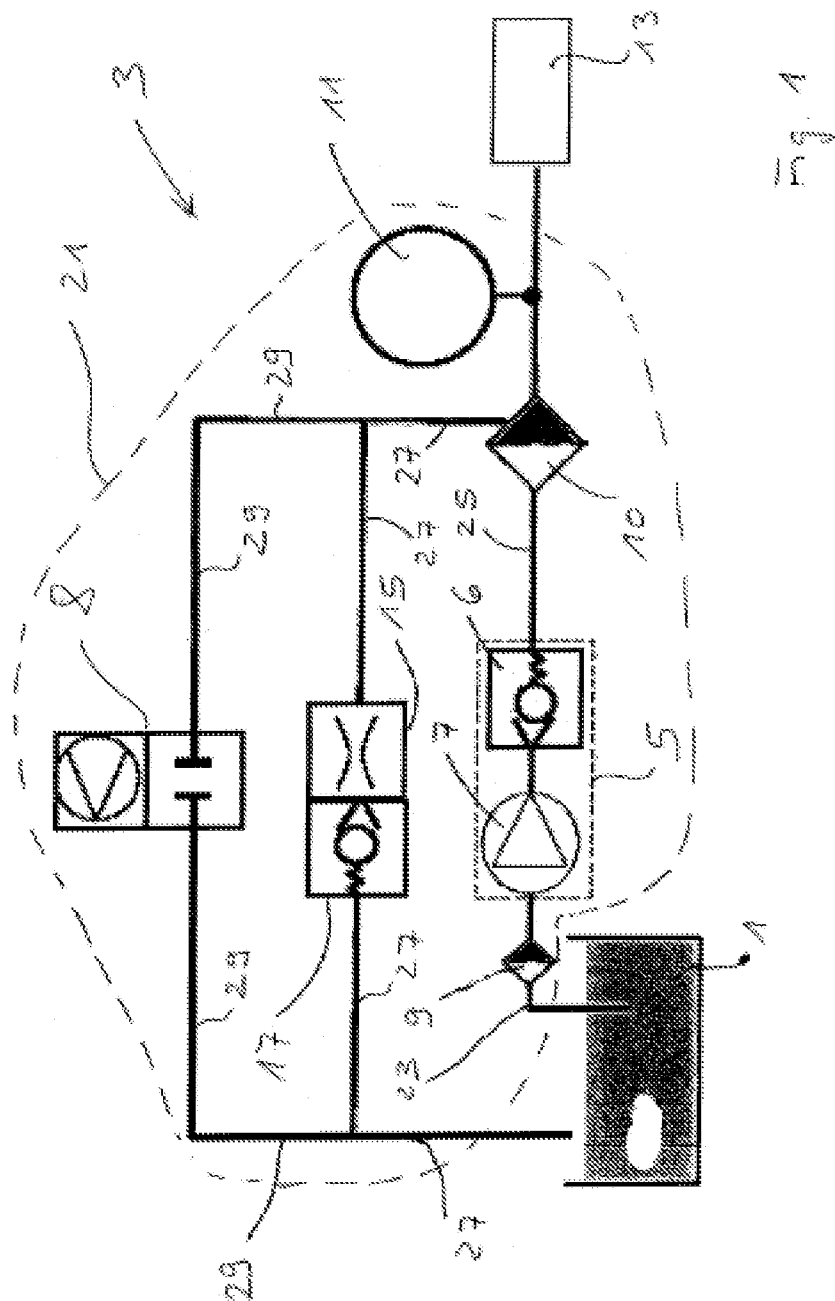
FIG. 1 shows a metering arrangement having a recirculation pump which is emptied via a return line.

FIG. 1 shows a metering arrangement 3 for an aqueous urea solution which is used as the exhaust-gas aftertreatment medium and is stored in a reservoir tank 1. In this context, a feed module 21 is provided which is connected via a pressure line 25 to a metering module 13. The feed module 21 comprises a feed pump unit 5 within which a nonreturn valve 6 follows a feed pump 7 on the pressure side. On the suction side the feed pump 7 is connected via a suction line 23 to the reservoir tank 1, wherein a prefilter 9 is arranged between the tank 1 and the feed pump unit 5. The pressure line 25 connects a pressure-side connection of the feed pump unit 5 to the metering module 13 via a main filter 10. In the region of the output side of the main filter 10 a return line 27 is connected which leads back to the reservoir tank 1 and ends there preferably above a maximum filling level of the tank 1. A series connection of a nonreturn valve 17 to a restrictor 15 is arranged in the return line 27. The recirculation valve 17 is arranged on the side of the return line facing the tank and can open toward the tank, and the restrictor 15 is arranged on the side of the return line facing the main filter 10. Alternatively, a reverse sequence of the restrictor and the nonreturn valve can also be provided. The restrictor 15 and nonreturn valve 17 are embodied as an integrated component. The feed module 21, has, in addition to the feed pump 7, a recirculation line pump 8 which can be switched according to requirements and which is connected via a recirculation line 29 on the input side to the pressure line 25 via the return line 27. The feed pump 7, the recirculation line pump 8, or both can be a diaphragm pump, and in particular a diaphragm pump with a rotating activation element. On the output side of the recirculation pump 8, the recirculation line 29 leads back to the tank via the side of the return line 27 facing the tank. A pressure sensor 11 is connected to the pressure line 25 in a region between the main filter 10 and the metering module 13.

A parallel connection of the recirculation pump 8 to a series connection of the nonreturn valve 17 to the restrictor 15 is present. On the one hand, the liquid exhaust-gas aftertreatment medium is sucked out of the tank via the feed pump unit in the metering mode and sprayed in a metered fashion into the exhaust gas section by means of the metering module 13, which can be configured as a switchable valve, upstream, in particular of a catalytic converter for performing selective catalytic reduction. Excess exhaust-gas aftertreatment medium flows back into the tank via the return line 27. On the other hand, after the internal combustion engine has been switched off the line system is sucked empty for the purposes of protection against freezing and/or corrosion. For this purpose, the metering module which can, in particular, be actuated electrically is opened and the recirculation pump 8 is switched on so that in particular the metering module and also the lines which otherwise conduct a fluid are emptied via the recirculation pump 8, and the respective exhaust-gas aftertreatment medium is fed back to the tank 1 using the return line 27, in particular on the side of the return line facing the tank.

Figure 2:
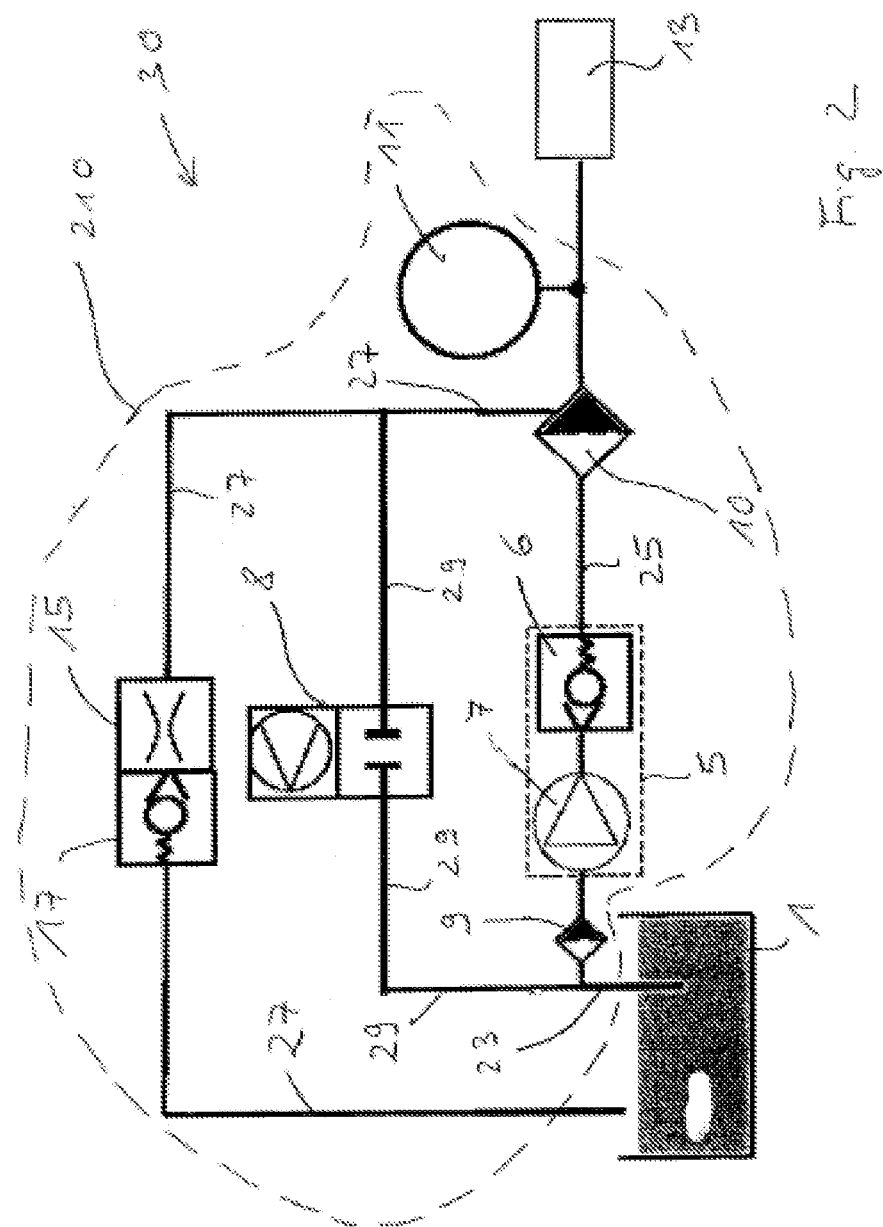
FIG. 2 shows a metering arrangement having a recirculation pump which is emptied via a suction line.

In FIG. 2, an alternative metering arrangement 30 with an alternative feed module 210 is illustrated. Identical or similar components are provided with identical reference symbols and will not be described again. In contrast to the arrangement according to FIG. 1, the output side of the recirculation pump 8 is not connected via the recirculation line 29 to the side of the return line 27 facing the tank but rather to the suction line 23. In this context, the recirculation line 29 opens into the suction line between the end of the suction line 23 projecting into the tank and the prefilter 9.

In contrast to the metering arrangement described first, in the present case the recirculation pump empties the arrangement via the side of the suction line 23 projecting into the tank. The advantage of this arrangement is that the line components with direct contact to the tank volume can be emptied.

The invention claimed is:

1. A metering arrangement (3, 30) for a liquid exhaust-gas aftertreatment medium for the aftertreament of exhaust gas of an internal combustion engine having an exhaust gas system, the metering arrangement comprising: a feed pump (7) and a metering module (13), wherein the feed pump (7) is connected to a suction line (23) for sucking the exhaust-gas aftertreatment medium out of a tank (1), wherein the feed pump (7) and the metering module (13) are connected to one another via a pressure line (25), and the exhaust-gas aftertreatment medium can be fed to the exhaust gas system via the metering module (13), further comprising a recirculation pump (8), which is connected on a suction side to the metering module (13), wherein the pressure line (25) is connected, between the feed pump (7) and the metering module (13), to a return line (27) which opens directly into the tank or above a maximum filling level of the tank, wherein the return line (27) has at least one of a restrictor (15) or a nonreturn valve (17) which opens toward the tank (1), wherein exhaust-gas aftertreatment medium, which is fed by the recirculation pump (8), can be recirculated to the tank via the return line, and wherein at least one of the feed pump (7) or the recirculation pump (8) is embodied as a diaphragm pump.

2. The metering arrangement as claimed in claim 1, characterized in that the recirculation pump (8) is connected on a pressure side to the suction line (23).

3. The metering arrangement as claimed in claim 1, characterized in that the pressure line (25) is connected to a pressure sensor (11) upstream of the metering module (13).

4. The metering arrangement as claimed in claim 1, characterized in that a filter (10) is arranged between the feed pump (7) and the metering module (13).

5. The metering arrangement as claimed in claim 1, characterized in that a nonreturn valve (6) is arranged between the feed pump (7) and the metering module (13).

6. The metering arrangement as claimed in claim 1, characterized in that a prefilter (9) is arranged in the suction line (23).

7. The metering arrangement as claimed in claim 1, wherein the recirculation pump (8) is embodied as a diaphragm pump.

8. A method for metering a liquid exhaust-gas aftertreatment medium, for the aftertreatment of the exhaust gas of an internal combustion engine having an exhaust gas system, in which the exhaust-gas aftertreatment medium is sucked out of a tank (1) via a suction line by means of a feed pump (7) and is fed to the exhaust gas system via a metering module (13), the method comprising: sucking the exhaust-gas aftertreatment medium out of the metering module (13) by means of a recirculation pump (8) and recirculating the sucked exhaust-gas aftertreatment medium from the metering module through a line that opens directly into the tank or above a maximum filling level of the tank, the line different from the suction line.

9. The method of claim 8, wherein the sucking the exhaust-gas aftertreatment medium out of the metering module (13) by means of the recirculation pump (8) means sucking the exhaust-gas aftertreatment medium out of the metering module after the internal combustion engine has been switched off.

* * * * *